United States Patent
Adiththan et al.

(10) Patent No.: US 11,975,728 B1
(45) Date of Patent: May 7, 2024

(54) VEHICLE SYSTEM AND METHOD FOR PROVIDING FEEDBACK BASED ON OCCUPANT BEHAVIOR AND EMOTION

(71) Applicant: GM Global Technology Operations LLC, Detroit, MI (US)

(72) Inventors: Arun Adiththan, Sterling Heights, MI (US); Aravind Gangumalla, Novi, MI (US); Vikramaditya Nimmagadda, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 18/055,580

(22) Filed: Nov. 15, 2022

(51) Int. Cl.
*B60W 40/09* (2012.01)
*B60W 50/08* (2020.01)
*B60W 60/00* (2020.01)

(52) U.S. Cl.
CPC ...... *B60W 50/082* (2013.01); *B60W 60/0051* (2020.02); *B60W 2420/403* (2013.01); *B60W 2420/408* (2024.01); *B60W 2420/54* (2013.01); *B60W 2510/202* (2013.01); *B60W 2520/105* (2013.01); *B60W 2540/21* (2020.02); *B60W 2540/221* (2020.02); *B60W 2540/30* (2013.01); *B60W 2552/53* (2020.02); *B60W 2556/10* (2020.02); *B60W 2556/45* (2020.02)

(58) Field of Classification Search
CPC ........... B60W 50/082; B60W 60/0051; B60W 2420/403; B60W 2420/408; B60W 2420/54; B60W 2510/202; B60W 2520/105; B60W 2540/21; B60W 2540/221; B60W 2540/30; B60W 2552/53; B60W 2556/10; B60W 2556/45
See application file for complete search history.

(56) References Cited

U.S. PATENT DOCUMENTS

| 2018/0118219 A1* | 5/2018 | Hiei | B60W 50/14 |
| 2020/0207358 A1* | 7/2020 | Katz | G02B 27/0093 |
| 2020/0223450 A1* | 7/2020 | Iwamoto | G05D 1/0212 |

* cited by examiner

*Primary Examiner* — An T Nguyen
(74) *Attorney, Agent, or Firm* — Vivacqua Crane PLLC

(57) ABSTRACT

A vehicle system for recommending driving automation based on occupant behavior and emotion includes one or more input devices. The input devices generate an input signal associated with sensor data indicative of a current emotion and a current driving pattern of an occupant. The vehicle system further includes a computer having a processor and a non-transitory computer readable storage medium (CRM). The CRM stores multiple occupant behavior profiles, with each occupant behavior profile including a unique occupant identification and multiple historical driving patterns. Each driving pattern has an associated historical emotion for the unique occupant identification. The processor is programmed to determine a deviation of the current driving pattern from the historical driving patterns, compare the deviation to a threshold, and generate a notification signal. The notification device provides the notification to recommend that the occupant actuate the vehicle system.

20 Claims, 2 Drawing Sheets

VEHICLE SYSTEM AND METHOD FOR PROVIDING FEEDBACK BASED ON OCCUPANT BEHAVIOR AND EMOTION

The present disclosure relates to autonomous vehicle systems, and more particularly to a vehicle system and method for recommending driving automation based on occupant emotion and behavior.

Car manufacturers are continuously developing autonomous vehicles (AVs) to decrease traffic congestion, because traffic congestion may cause decreased productivity, wasted energy, and pollution. Each AV may moderate the speed of traffic to serve as a buffer between the vehicles behind the AV and the vehicles in front of the AV, such that those vehicles may brake less often. Certain AVs may be semi-autonomous vehicles that require an occupant to activate a self-driving mode. However, the occupant may have an emotional experience and/or health event (e.g., a seizure, a loss of consciousness, a stroke, cardiac arrest, and the like) prior to or while operating the AV, such that the occupant may be distracted and not activate the self-driving mode. Furthermore, the occupant may drive the AV in a manner that deviates from past driving patterns (e.g., driving less than a historical minimum distance from the vehicle in front of the occupant). As a result, the occupant may need to frequently apply brakes, which can lead to an increase traffic congestion.

Thus, while existing vehicle systems achieve their intended purpose, there is a need for a new and improved vehicle system that addresses these issues.

SUMMARY

According to several aspects of the present disclosure, a vehicle system for providing feedback based on occupant behavior and emotion includes one or more input devices. The input devices are attached to the vehicle. The input devices collect sensor data associated with a current emotion and a current driving pattern of an occupant, and the input devices generate an input signal associated with the sensor data. The vehicle system further includes one or more notification devices attached to the vehicle, with the notification devices providing a notification that recommends that the occupant actuate the vehicle system for autonomously driving the vehicle. The vehicle system further includes a computer attached to the vehicle, with the computer having one or more processors electronically connected to the input device and the notification device. The computer further includes a non-transitory computer readable storage medium (CRM) for storing a plurality of occupant behavior profiles. Each occupant behavior profile includes a unique occupant identification and an associated plurality of historical driving patterns. Each of the historical driving patterns has an associated historical emotion for the unique occupant identification. The CRM further includes instructions, such that the processor is programmed to receive the input signal from the input device. The processor is further programmed to construct an emotion vector and the current driving pattern of the occupant, in response to the processor receiving the input signal from the input device. The processor is further programmed to collect, from the CRM, the occupant behavior profile that is associated with the occupant. The processor is further programmed to determine a deviation of the current driving pattern from the historical driving patterns. The processor is further programmed to compare the deviation to one or more thresholds. The processor is further programmed to generate one or more notification signals, in response to the processor determining that the deviation is above the threshold. The notification device provides the notification that recommends that the occupant actuate the vehicle system for autonomously driving the vehicle, in response to the notification device receiving the notification signal from the processor.

In one aspect, the vehicle system further includes a longitudinal control submodule for controlling a propulsion actuation device and/or a braking actuation device. The vehicle system further includes a lateral control submodule for controlling a steering actuation device. The vehicle system further includes a Human Machine Interface (HMI) for generating an activation signal to actuate the vehicle system, in response to the occupant operating the HMI. The processor is electronically connected to the longitudinal control submodule, the lateral control submodule, and the HMI. The processor generates a driving actuation signal, in response to the processor receiving the activation signal from the HMI. The longitudinal control submodule and the lateral control submodule autonomously operate the vehicle, in response to the longitudinal control submodule and the lateral control submodule receiving the driving actuation signal from the processor.

In another aspect, the thresholds include first and second thresholds, with the second threshold being below the first threshold. The notification signal includes first and second notification signals. The processor is further programmed to compare the deviation to the first threshold. The processor is further programmed to generate the first notification signal, in response to the processor determining that the deviation is above the first threshold. The notification device requests the occupant to actuate the vehicle system to autonomously drive the vehicle, in response to the notification device receiving the first notification signal from the processor. The processor is further programmed to compare the deviation to the second threshold, in response to the processor determining that the deviation is not above the first threshold. The processor is further programmed to generate the second notification signal, in response to the processor determining that the deviation is above the second threshold. The notification device provides, to the occupant, feedback associated with the current driving pattern, in response to the notification device receiving the second notification signal from the processor.

In another aspect, the processor is further programmed to generate the driving actuation signal, in response to the processor determining that the occupant accepted the request to actuate the vehicle system for autonomously driving the vehicle.

In another aspect, the processor is further programmed to generate an override actuation signal, in response to the processor determining that the deviation is above the first threshold and the processor further determining that the occupant did not accept the request to actuate the vehicle system for autonomously driving the vehicle. The longitudinal control submodule stops the vehicle and turns off the vehicle, in response to the longitudinal control submodule receiving the override actuation signal from the processor.

In another aspect, the processor is further programmed to transmit a message to one or more communication devices of one or more associated predetermined contacts, in response the processor determining that the deviation is above the first threshold and the processor further determining that the occupant did not accept the request to actuate the vehicle system for autonomously driving the vehicle. The message indicates, to the predetermined contact, the deviation of the current driving pattern.

In another aspect, the processor is further programmed to update the occupant behavior profile to include the current driving pattern.

In another aspect, the vehicle system further includes a remote server for storing the occupant behavior profile, and the remote server wirelessly communicates with the processor.

In another aspect, the input devices include an occupant-facing camera attached to the vehicle, with the occupant-facing camera generating the input signal in response to the occupant-facing camera capturing an appearance of the occupant. The input devices further include a wearable device carried by the occupant, with the wearable device having an Impulse Radio Ultra-Wide Band RADAR component (IR-UWB RADAR component) generating the input signal in response to the IR-UWB RADAR component measuring a pulse rate, a blood oxygen, a respiratory rate, a blood pressure and/or a temperature of the occupant. The input devices further include a microphone attached to the vehicle, with the microphone generating the input signal in response to the microphone capturing one or more words spoken by the occupant, a volume of a voice of the occupant, and a tone of the voice.

In another aspect, the input devices further include a torque sensor attached to a steering wheel of the vehicle, with the torque sensor measuring a torque that the occupant applies to the steering wheel. The input devices further include an accelerometer attached to the vehicle, with the accelerometer measuring a plurality of acceleration forces on the occupant in response to the occupant operating the vehicle. The input devices further include a LIDAR sensor attached to the vehicle, with the LIDAR sensor measuring a distance between the vehicle and an object in front of the vehicle. The input devices further include an externally-facing camera attached to the vehicle, with the externally-facing camera detecting a plurality of lane lines on a road.

According to several aspects of the present disclosure, a computer is provided for a vehicle system to provide feedback based on occupant behavior and emotion. The computer includes one or more processors attached to the vehicle, with the processor electronically connected to one or more input devices and one or more notification devices. The computer further includes a non-transitory computer readable storage medium (CRM) storing a plurality of occupant behavior profiles. Each occupant behavior profile includes a unique occupant identification and an associated plurality of historical driving patterns. Each historical driving pattern has an associated historical emotion for the unique occupant identification. The CRM further includes instructions, such that the processor is programmed to receive the input signal from the input device. The input signal is associated with sensor data indicating a current emotion and a current driving pattern of an occupant. The processor is further programmed to construct an emotion vector and the current driving pattern of the occupant, in response to the processor receiving the input signal from the input device. The processor is further programmed to collect, from the CRM, the occupant behavior profile that is associated with the occupant. The processor is further programmed to determine a deviation of the current driving pattern from the historical driving patterns. The processor is further programmed to compare the deviation to one or more thresholds. The processor is further programmed to generate notification signal, in response to the processor determining that the deviation is above the threshold, such that notification device provides a notification that recommends that the occupant actuate the vehicle system for autonomously driving the vehicle, in response to the notification device receiving the notification signal from the processor.

In one aspect, the thresholds include first and second thresholds, with the second threshold being below the first threshold. The notification signal includes first and second notification signals. The processor is further programmed to compare the deviation to the first threshold. The processor is further programmed to generate the first notification signal, in response to the processor determining that the deviation is above the first threshold. The notification device requests the occupant to actuate the vehicle system to autonomously drive the vehicle, in response to the notification device receiving the first notification signal from the processor. The processor is further programmed to compare the deviation to the second threshold, in response to the processor determining that the deviation is not above the first threshold. The processor is further programmed to generate the second notification signal, in response to the processor determining that the deviation is above the second threshold. The notification device provides, to the occupant, feedback associated with the current driving pattern, in response to the notification device receiving the second notification signal from the processor.

In another aspect, the processor is further programmed to generate the driving actuation signal, in response to the processor determining that the occupant accepted the request to actuate the vehicle system for autonomously driving the vehicle.

In another aspect, the processor is further programmed to generate an override actuation signal, in response to the processor determining that the deviation is above the first threshold and the processor further determining that the occupant did not accept the request to actuate the vehicle system for autonomously driving the vehicle. The longitudinal control submodule stops the vehicle and turns off the vehicle, in response to the longitudinal control submodule receiving the override actuation signal from the processor.

In another aspect, the processor is further programmed to transmit a message to one or more communication devices of one or more associated predetermined contacts, in response the processor determining that the deviation is above the first threshold and the processor further determining that the occupant did not accept the request to actuate the vehicle system for autonomously driving the vehicle. The message indicates, to the predetermined contact, the deviation of the current driving pattern.

In another aspect, the processor is further programmed to update the occupant behavior profile to include the current driving pattern.

In another aspect, the processor is further programmed to categorize the current driving pattern based on the current emotion and a number of occupants in the vehicle.

According to several aspects of the present disclosure, a method is provided for operating a computer of a vehicle system to provide feedback based on occupant behavior and emotion. The method includes receiving, using one or more processors of the computer, an input signal from one or more input devices, with the input signal being associated with sensor data indicating a current emotion and a current driving pattern of an occupant. The method further includes determining, using the processor, an emotion vector and the current driving pattern of the occupant, in response to the processor receiving the input signal from the input device. The method further includes collecting, using the processor, an occupant behavior profile from a non-transitory computer readable storage medium (CRM), with the occupant behavior profile being associated with the occupant. The method further includes determining, using the processor, a deviation of the current driving pattern from a plurality of historical driving patterns that are stored in the CRM. The method further includes comparing, using the processor, the deviation to one or more thresholds stored in the CRM. The method further includes generating, using the processor, one or more notification signals in response to the processor determining that the deviation is above the threshold, such that notification device provides a notification that recommends that the occupant actuate the vehicle system for autonomously driving the vehicle in response to the notification device receiving the notification signal from the processor.

In one aspect, the method further includes comparing, using the processor, the deviation to a first threshold. The method further includes generating, using the processor, a first notification signal of the notification signals in response to the processor determining that the deviation is above the first threshold, where the notification device requests the occupant to actuate the vehicle system to autonomously drive the vehicle in response to the notification device receiving the first notification signal from the processor. The method further includes comparing, using the processor, the deviation to the second threshold in response to the processor determining that the deviation is not above the first threshold. The method further includes generating, using the processor, a second notification signal of the notification signal in response to the processor determining that the deviation is above the second threshold. The notification device provides, to the occupant, feedback associated with the current driving pattern in response to the notification device receiving the second notification signal from the processor.

In another aspect, the method further includes generating, using the processor, the driving actuation signal in response to the processor determining that the occupant accepted the request to actuate the vehicle system for autonomously driving the vehicle. The method further includes generating, using the processor, an override actuation signal in response to the processor determining that the deviation is above the first threshold and the processor further determining that the occupant did not accept the request to actuate the vehicle system for autonomously driving the vehicle. The longitudinal control submodule stops the vehicle and turns off the vehicle in response to the longitudinal control submodule receiving the override actuation signal from the processor. The method further includes transmitting, using the processor, a message to a communication device of a predetermined contact in response the processor determining that the deviation is above the first threshold and the processor further determining that the occupant did not accept the request to actuate the vehicle system for autonomously driving the vehicle. The message indicates, to the predetermined contact, the deviation of the current driving pattern.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a vehicle 100 having a vehicle system 102 with a computer 104, which recommends actuation of the vehicle system 102 based on occupant behavior and emotion. Non-limiting examples of the vehicle 100 (e.g., a sedan, a light duty truck, a heavy duty truck, a sport utility vehicle, a van, a motor home, a passenger bus, a commercial truck, a waste collection vehicle, a utility vehicle, a delivery vehicle, an emergency vehicle, etc.) may include semi-autonomous vehicles with an associated propulsion system (e.g., an electric motor and/or an internal combustion engine, hydrogen fuel cells, etc.). The vehicle system 102 provides, to an occupant (e.g., a driver, a user, etc.), feedback based on a current occupant emotion and a current occupant pattern that is deviating from an historical driving pattern by at least a predetermined threshold. As a result, the occupant may actuate the vehicle system 102 for autonomously driving the vehicle 100 to decrease traffic congestion and in turn decrease lost time, wasted energy, and pollution. It is contemplated that the occupant may actuate the vehicle system for providing other suitable benefits.

Figure 1:
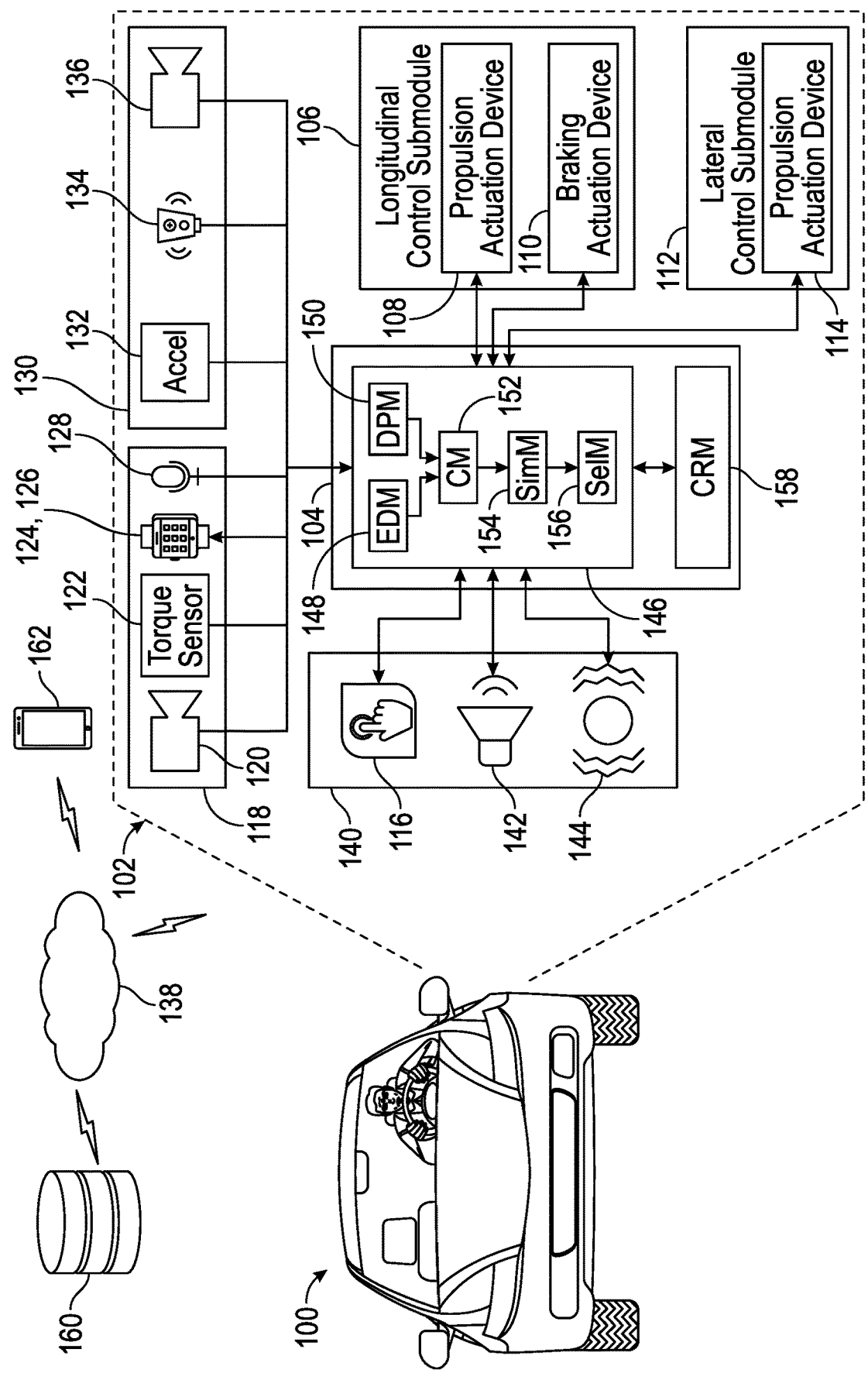
FIG. 1 is a schematic view of one example of a vehicle having a system including a computer for providing feedback based on occupant behavior and emotion to operate the vehicle.

Referring to FIG. 1, one non-limiting example of the vehicle 100 is the semi-autonomous vehicle, which includes a longitudinal control submodule 106 for controlling a propulsion actuation device 108 and/or a braking actuation device 110. The vehicle 100 may further include a lateral control submodule 112 for controlling a steering actuation device 114 of the vehicle 100. The semi-autonomous vehicle further includes an accelerator, a brake, and a steering wheel that are manually operated by a driver.

The vehicle 100 further includes a Human Machine Interface (HMI) 116 for generating an activation signal to actuate the vehicle system in response to the occupant operating the HMI 116. In some non-limiting examples, the HMI 116 may include a center console dashboard touchscreen display, an instrument panel display, steering wheel-mounted controls, and/or the like.

The vehicle system 102 further includes one or more input devices 118 attached to the vehicle 100. The input devices 118 collect sensor data indicating a current emotion of the occupant, and each of the input devices 118 generates an input signal associated with the sensor data. The input devices 118 may be part of a Driver Monitoring System (DMS) that monitors facial expressions, body movement, and/or other behavior of the occupant, which indicate emotion. One non-limiting example of the input device 118 may include an occupant-facing camera 120 attached to the vehicle 100, with the occupant-facing camera 120 generating the input signal in response to the occupant-facing camera 120 capturing an appearance of the occupant. Another non-limiting example of the input device 118 may include a torque sensor 122 attached to a steering wheel of the vehicle 100, with the torque sensor 122 measuring a torque that the occupant applies to the steering wheel. Yet another non-limiting example of the input device 118 may include a wearable device 124 (e.g., a smartwatch, a chest strap, etc.) carried by the occupant, with the wearable device 124 having an Impulse Radio Ultra-Wide Band RADAR component 126 (IR-UWB RADAR component) generating the input signal in response to the IR-UWB RADAR component 126 measuring a pulse rate, a blood oxygen, a respiratory rate, a blood pressure, and/or a temperature of the occupant. Yet another non-limiting example of the input device 118 may include a microphone 128 attached to the vehicle 100, with the microphone 128 generating the input signal in response to the microphone 128 capturing one or more words spoken by the occupant, a volume of a voice of the occupant, and a tone of the voice. The input devices may be biometric sensors, pressure sensors in the steering wheel, or other suitable input devices for collecting sensor data indicating the current emotion of the occupant.

The vehicle system 102 may further include other input devices 130 for collecting sensor data that indicates a current driving pattern of the occupant and generating an input signal associated with the sensor data. One non-limiting example of these input devices 130 may include an accelerometer 132 attached to the vehicle 100, with the accelerometer 132 measuring a plurality of acceleration forces on the occupant in response to the occupant operating the vehicle. Another non-limiting example of these input devices 130 may include a LIDAR sensor 134 attached to the vehicle 100, with the LIDAR sensor 134 measuring a distance between the vehicle 100 and an object in front of the vehicle 100 (e.g., a leading vehicle that the vehicle 100 is following). Yet another non-limiting example of these input devices 130 may include an externally-facing camera 136 attached to the vehicle 100, with the externally-facing camera 136 detecting a plurality of lane lines on a road. Other non-limiting examples of input devices 130 may include on-board sensors (e.g., a RADAR sensor, a night-vision camera, an infrared camera, an ultrasonic sensor, a steering wheel angle sensor, a brake sensor, a wheel speed sensor, etc.). Still another non-limiting example of these input devices 130 may include off-board devices in a data and communication network 138 (e.g., a cellular network, a Dedicated Short-Range Communications (DSRC) network, a Vehicle-To-Infrastructure (V2X) network, a Global Positioning Satellite (GPS) network, a Wi-Fi network, a road traffic monitoring network, a road database, an Internet network, etc.). It contemplated that the input device may be a multi-modal input system.

The vehicle system 102 further includes one or more notification devices 140 for providing a notification that recommends that the occupant actuate the vehicle system 102 for autonomously driving the vehicle 100. One non-limiting example of the notification device 140 may include a speaker 142 for playing a chime or spoken announcement, such as "Automated Driving Recommended." Another non-limiting example of the notification device 140 may include a haptic device 144 and/or the HMI 116 with a touchscreen display that displays a message, such as "Automated Driving Recommended". It is contemplated that the vehicle system may have other suitable notification devices.

The vehicle system 102 further includes a computer 104 attached to the vehicle 100, with the computer 104 having one or more processors 146 electronically connected to the input devices 118, 130, the notification devices 140, the longitudinal control submodule 106, the lateral control submodule 112, and the HMI 116. As described in more detail below, the processors 146 include an emotion detection module 148, a driving pattern module 150, a combiner module 152, a similarity module 154, and a selection module 156. It is to be appreciated that although the one or more processors 146 are illustrated as on-board the vehicle 100, other processing mechanisms such as edge-based processing or cloud processing may be used as well.

The computer 104 further includes a non-transitory computer readable storage medium 158 (CRM) electrically connected to the processor 146 and storing a plurality of occupant behavior profiles. Each of the occupant behavior profiles includes a unique occupant identification, a plurality of timestamps for the associated historical driving patterns, a number of vehicle occupants for each of the historical driving patterns, a classification (child, elderly, adult, special needs individual, etc.) of each occupant, a plurality of historical emotions of the occupant for the associated historical driving patterns, one or more deviations, one or more thresholds of deviation, a record of whether autonomy was engaged after each deviation, and/or the like. The CRM 158 may further store a plurality of historical driving patterns associated with each of the unique occupant identifications. Each historical driving pattern can include data for each occupant directed to: a following distance associated with a lead vehicle and based on a current speed, a history of lane deviation, a history speed limit violations, a history of velocity change (e.g., braking and/or accelerating above a predetermined threshold, etc.), a history of turning signal usage, and/or the like. The processor 146 is further programmed to collect, from the CRM 158 and/or a remote server 160 (e.g., in the back office of a manufacturer wirelessly communicating with the processor 146), the occupant behavior profile associated with the occupant as described in detail below.

In this non-limiting example, the CRM 158 stores a plurality of content clusters that each describe a specific historical driving pattern, which may be segmented into different sections based on emotional content. Thus, each segment of a historical driving pattern may be associated with a unique content cluster. Although FIG. 1 illustrates the CRM 158 as one or more recording databases stored locally, it is to be appreciated that FIG. 1 is merely exemplary in nature and the CRM may also be stored online (e.g., the remote server 160 in the back office of the manufacturer).

Also, in this non-limiting example, the CRM 158 further includes instructions, such that the processor 146 is programmed to receive the input signals from the associated input devices 118 and construct or determine an emotion vector of the occupant, in response to the processor 146 receiving the input signals from the associated input devices 118. In one example, the processor 146 may construct the emotion vector pursuant to the method and system disclosed in U.S. application Ser. No. 17/747,186, which is incorporated herein by its entirety. More specifically, the emotion detection module 148 receives the input signal from the associated input devices 118 and uses one or more machine learning techniques to determine one or more of the emotion vectors that numerically represent the current emotion of the occupant based on the sensor data associated with the input signals. As mentioned above, the input signals are associated with sensor data indicating the current emotion of the occupant. The emotion detection module 148 receives the sensor data collected from the input devices 118 and determines, based on one or more machine learning techniques, one or more emotion vectors based on the sensor data. The one or more machine learning techniques are explained in greater detail below. The emotion vectors numerically represent an emotional state exhibited by the occupant 16 while the occupant is driving the vehicle 100.

The emotion detection module 148 shall now be described. As mentioned above, the emotion detection module 148 determines the emotion vectors based on one or more machine learning techniques. In an embodiment, the one or more machine learning techniques is either a Gaussian mixture model (GMM) or, in the alternative, a combined Gaussian mixture model and Deep Neural Network (GMM-DNN). A Gaussian mixture model equation is expressed in Equation 1 below, where a unique Gaussian mixture model is trained for each emotional state of the occupant 16.

Equation 1 includes emotional classes K that each signify an emotional state of the occupant 16 (e.g., K={angry, happy, sad, neutral}) and classifiers C, which represent different sensor modalities. The different sensor modalities refer to the different input devices 118 (e.g., C={DMS camera, IR-UWB RADAR system, seat pressure sensor, steering wheel torque sensor}), where Equation 1 solves for a combined emotional vector that is determined based on the different classifiers or sensor modalities. In other words, the emotion vectors determined by the Gaussian mixture model are a combined emotional vector that is determined based on the different sensor modalities available onboard the vehicle 12.

The emotion detection module 148 receives the sensor data captured during a specific time window such as, for example, about sixty seconds. The term x in Equation 1 below represents an observation during the specific time window, and the observation x constitute sensor inputs captured during a specific time window, where each observation x is expressed as $x=\{x_1, x_2, \ldots x_n\}$, and where $x_i$ is a subset of features of x used by classifier output $\lambda_i$=i=1, 2, ..., C. For each observation x, a class label ω exists belonging to one of the emotional classes K. Equation 1 is expressed as:

$$P(\omega|x) = \sum_{i=1}^{C}\sum_{k=1}^{K} P(\omega|\widetilde{\omega}_k, \lambda_i) P(\widetilde{\omega}_k|\lambda_i, x) P(\lambda_i|x) \quad \text{Eqn. 1}$$

where $P(\omega|x)$ represents the emotion vectors, $P(\widetilde{\omega}_k \lambda_i, x)$ is the prediction of the classifier output $\lambda_i$, $P(\omega|\widetilde{\omega}_k, \lambda_i)$ is the probability for a given class label ω given that classifier output $\lambda_i$ is assigned a specific label (e.g., $\omega_k$=happy), and $P(\lambda_i|x)$ is the probability of classifier output $\lambda_i$ for a given observation window x. The emotion vectors are determined by solving for Equation 1, where the emotional vectors represent a specific emotional state of the occupant 16 as determined based on multiple sensor modalities.

In one example, the classifier output $\lambda_1$ represents the output from the DMS camera, and x: $\omega_1$=[0.05, 0.72, 0.01, 0.22], which indicates the emotional state is highly likely to be happy. The classifier output $\lambda_2$ represents the output from the IR-UWB RADAR system, and x: $\omega_2$=[0.1, 0.6, 0.08, 0.31]. In the present example, the combined emotional vector of both classifier outputs $\lambda_1$, $\lambda_2$ are expressed as P(ω|x)=[0.06, 0.7, 0.04, 0.2].

In another example, the emotion detection module 148 determines the emotion vector based on the combined Gaussian Mixture Model and Deep Neural Network (GMM-DNN). In this embodiment, the emotion detection module 148 determines the emotion vector using the GMM described above, which is then supplied to a DNN. The DNN also receives the sensor data as input and determines the emotion vector based on the input. In embodiments, the DNN is a convolutional neural network (CNN).

The combiner module 152 receives the occupant pattern vector and the emotional vector and appends the driving pattern vector and the emotional vector together into a combined driving pattern and emotion vector. Continuing with the previous non-limiting example, the similarity module 154 compares the combined driving pattern and emotion vector with the content clusters (e.g., the historical driving patterns etc.) stored in the CRM 158 and selects the content cluster in the CRM 158 or the remote server 160, which is most similar to the combined driving pattern and emotion vector. In embodiments, the content cluster may describe a segment of a specific historical driving pattern. In this non-limiting example, the similarity module 154 selects the content cluster most similar to the combined driving pattern and emotion vector based on cosine similarity, however, it is to be appreciated that other measures of similarity between two sequences of numbers may be used as well.

The processor 146 is programmed to determine the current emotion vector and the associated current driving pattern vector based on a plurality of observations. More specifically, in this non-limiting example, the current emotion vector of the occupant may have the following classifiers according to Equation 2:

$$D_{em}=[\{happy:v1\},\{sad:v2\},\{neutral:v3\},\{angry:v_n\}] \quad \text{Eqn. 2}$$

where $D_{em}$ represents the emotion vector of the occupant. Also, in this non-limiting example, the associated driving pattern vector may have the following classifiers according to Equation 3:

$$V_{dp}=[\{fol\_dist:v1\},\{lane\_dev:v2\},\{vel\_change:v3\}] \quad \text{Eqn. 3}$$

where $V_{dp}$ represents the deviation of the current occupant pattern from the historical occupant pattern associated with the current one; $fol_{dist}$: v1 represents compliance with historical following distances; $lane_{dev}$: v2 represents compliance with historical lane position and/or centering; and vel_change: v3 represents compliance with historical acceleration and/or braking.

The processor 146 is further programmed to determine a deviation of the current driving pattern from the historical driving patterns (e.g., most similar content clusters) for the occupant. In this non-limiting example, the processor 146 is further programmed to compare the deviation to one or more thresholds. In this non-limiting example, the processor 146 may determine, within a first time window $T_1$, the three following observations $Obs_1$, $Obs_2$, $Obs_3$ with the associated emotion vectors $D_{em1}$, $D_{em2}$, $D_{em3}$ and the deviations of the current occupant pattern from the historical occupant pattern $V_{dp1}$, $V_{dp2}$, $V_{dp3}$, according to Equations 4, 5, and 6:

$$Obs_1:D_{em1}=[0.8,0.01,0.15,0.04];V_{dp1}=[1.0,0.9,0.8] \quad \text{Eqn. 4}$$

$$Obs_2:D_{em2}=[0.8,0.01,0.15,0.04];V_{dp2}=[1.0,1.0,0.9] \quad \text{Eqn. 5}$$

$$Obs_3:D_{em3}=[0.8,0.01,0.15,0.04];V_{dp3}=[1.0,1.0,1.0] \quad \text{Eqn. 6}$$

where the processor 146 determines that the occupant primarily exhibits happy emotions and the processor 146 further determines that the current driving pattern for following distance, lane centering, and velocity change deviates from the historical driving patterns within the associated thresholds.

In another non-limiting example, the processor 146 may determine, within a second time window $T_2$, the three following observations $Obs_4$, $Obs_5$, $Obs_6$ with the associated emotion vectors $D_{em4}$, $D_{em5}$, $D_{em6}$ and the deviations of the current occupant pattern from the historical occupant pattern $V_{dp4}$, $V_{dp5}$, $V_{dp6}$, according to Equations 7, 8, and 9:

$$Obs_4 : D_{em4} = [0.00, 0.10, 0.00, 0.90]; V_{dp4} = [1.70, 1.20, 1.20] \quad \text{Eqn. 7}$$

$$Obs_5 : D_{em5} = [0.07, 0.08, 0.10, 0.75]; V_{dp5} = [1.50, 1.30, 1.10] \quad \text{Eqn. 8}$$

$$Obs_6 : D_{em6} = [0.00, 0.04, 0.01, 0.95]; V_{dp6} = [1.80, 1.20, 1.30] \quad \text{Eqn. 9}$$

where the processor 146 determines that the occupant primarily exhibits angry emotions and the processor 146 further determines that the current driving pattern for following distance, lane centering, and velocity change deviates from the historical driving patterns by more than the associated thresholds.

The processor 146 is further programmed to compare the deviation to the one or more thresholds and generate one or more notification signals, in response to the processor 146 determining that the deviation is above one or more of the thresholds. The notification device 140 provides the notification that recommends that the occupant actuate the vehicle system 102 for autonomously driving the vehicle 100, in response to the notification device 140 receiving one or more notification signals from the processor 146. More specifically, in this non-limiting example, the thresholds include a first threshold and a second threshold that is below the first threshold. The notification signals including first and second notification signals. The processor 146 is programmed to compare the deviation to the first threshold and generate the first notification signal, in response to the processor 146 determining that the deviation is above the first threshold. The notification device 140 requests the occupant to actuate the vehicle system 102 to autonomously drive the vehicle 100, in response to the notification device 140 receiving the first notification signal from the processor 146. The processor 146 is further programmed to generate an override actuation signal, in response to the processor 146 determining that the deviation is above the first threshold and the processor 146 further determining that the occupant did not operate the HMI 116 to generate the activation signal for accepting the request to actuate the vehicle system 102 to autonomously drive the vehicle 100. The longitudinal control submodule 106 stops the vehicle 100 and turns off the vehicle 100, in response to the longitudinal control submodule 106 receiving the override actuation signal from the processor 146. The processor 146 is further programmed to transmit a message to one or more communication devices 162 of one or more predetermined contacts (e.g., by a mobile phone, a landline telephone, a wearable device, a desktop computer, a laptop computer, computer tablet, etc.), in response the processor 146 determining that the deviation is above the first threshold and the processor 146 further determining that the occupant did not accept the request to actuate the vehicle system for autonomously driving the vehicle. The message indicates, to the predetermined contact, the deviation of the current driving pattern.

The processor 146 is further programmed to compare the deviation to the second threshold, in response to the processor 146 determining that the deviation is not above the first threshold. The processor 146 is further programmed to generate the second notification signal, in response to the processor 146 determining that the deviation is above the second threshold. The notification device 140 provides, to the occupant, feedback associated with the current driving pattern (e.g., a warning and/or notification directed to the current driving pattern, etc.), in response to the notification device 140 receiving the second notification signal from the processor 146. The processor 146 is further programmed to update the occupant behavior profile stored in the CRM 158 and/or the remote server 160 to include the current driving pattern. The processor 146 is further programmed to categorize the current driving pattern, as saved in the CRM 158 and/or the remote server 160, based on the unique occupant identification, the current emotion, and a number of occupants in the vehicle 100.

The processor 146 is further programmed to generate a driving actuation signal, in response to the processor 146 determining that the occupant accepted the request to actuate the vehicle system 102 for autonomously driving the vehicle 100 (e.g., the occupant operated the HMI 116 to generate the activation signal and the processor generating the driving actuation signal in response to the processor receiving the activation signal). The longitudinal control submodule 106 and the lateral control submodule 112 autonomously operate the vehicle 100, in response to the longitudinal control submodule 106 and the lateral control submodule 112 receiving the driving actuation signal from the processor 146.

Figure 2:
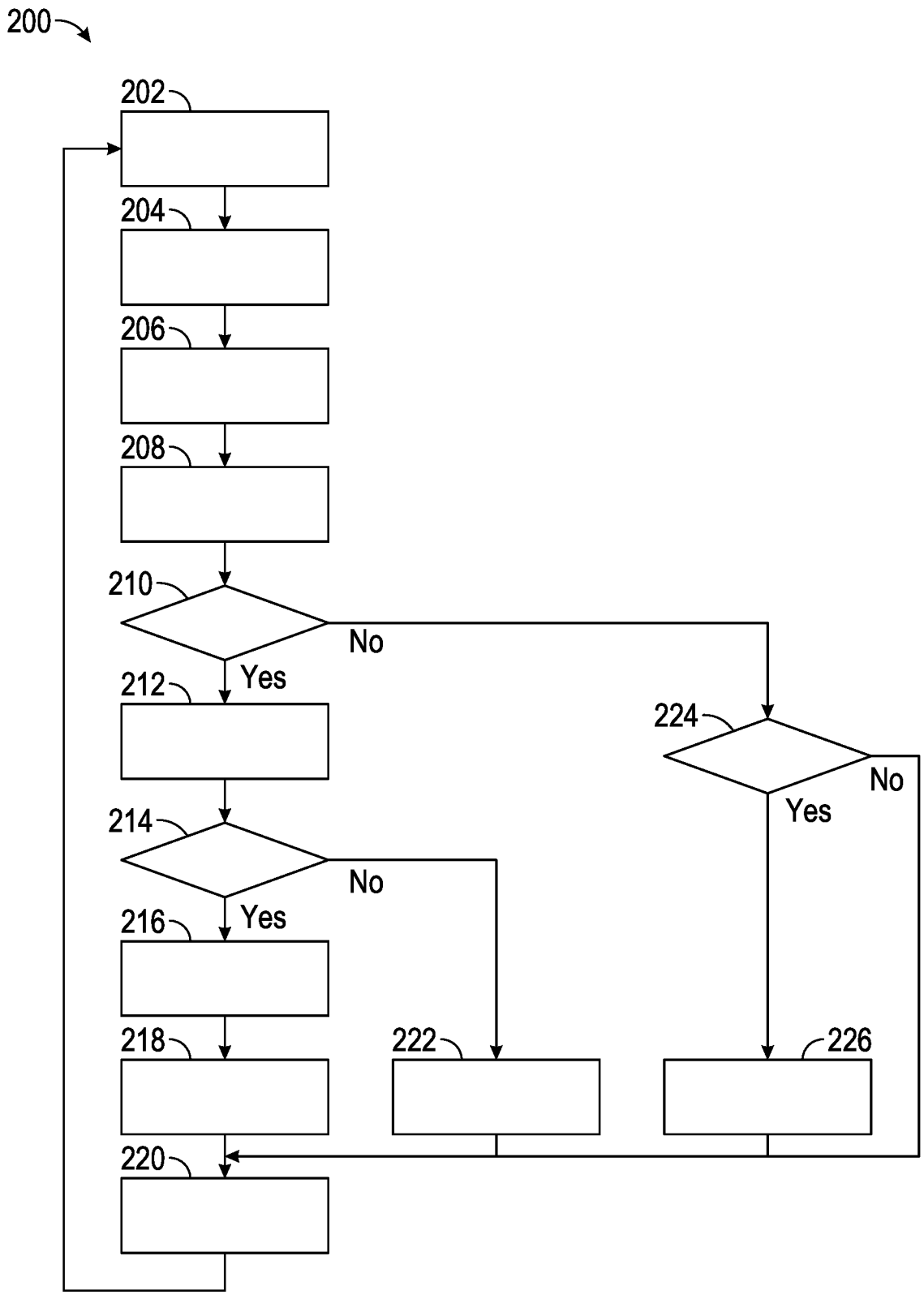
FIG. 2 is a flow chart of one example of a method of operating the computer of FIG. 1.

Referring to FIG. 2, one exemplary method 200 is provided for operating the vehicle 100 of FIG. 1. The method 200 begins at block 202 with generating, using one or more of the input devices 118, the input signal associated with sensor data that indicates the current emotion and the current driving pattern of the occupant. The method 200 further includes receiving, using processor 146 of the computer 104, the input signal from the input devices. The method 200 then proceeds to block 204.

At block 204, the method 200 further includes determining, using the processor 146, the emotion vector and the current driving pattern of the occupant, in response to the processor 146 receiving the input signal from the input device 118. The method 200 then proceeds to block 206.

At block 206, the method 200 further includes collecting, using the processor 146, the occupant behavior profile associated with the occupant from the CRM 158. The method 200 then proceeds to block 208.

At block 208, the method 200 further includes determining, using the processor 146 and one or more machine language techniques as described above, the deviation of the current driving pattern from the historical driving patterns that are stored in the CRM 158. The method 200 then proceeds to block 210.

At block 210, the method 200 further includes comparing, using the processor 146 and one or more machine language techniques as described above, the deviation to at least one threshold stored in the CRM. If the deviation is above the first threshold, the method 200 proceeds to block 212. In this non-limiting example, the method 200 includes comparing, using the processor 146, the deviation to the first threshold. If the deviation is not above the first threshold, the method 200 proceeds to block 216.

At block 212, the method 200 further includes generating, using the processor 146, at least one notification signal in response to the processor 146 determining that the deviation is above the at least one threshold, such that notification device 140 provides a notification that recommends that the occupant actuate the vehicle system for autonomously driving the vehicle in response to the notification device 140 receiving the at least one notification signal from the processor. Continuing with the previous non-limiting example, the method 200 includes generating, using the processor 146, the first notification signal in response to the processor 146 determining that the deviation is above the first threshold. The notification device 140 requests the occupant to actuate the vehicle system to autonomously drive the vehicle 100 (e.g., "Automated Driving Recommended" etc.) in response to the notification device 140 receiving the first notification signal from the processor 146. The method 200 then proceeds to block 214.

At block 214, the method 200 further includes determining, using the processor 146, whether the occupant actuated the vehicle system 102 for autonomously driving the vehicle 100. In one non-limiting example, the processor 146 may determine whether the occupant operated the HMI 116 to generate the activation signal that is received by the processor 146 for generating the driving actuation signal. If the processor 146 determines that the occupant actuated the vehicle system 102, the method proceeds to block 216. If the processor 146 determines that the occupant did not actuate the vehicle system 102, the method proceeds to block 220.

At block 216, the method 200 further includes generating, using the processor 146, the driving actuation signal in response to the processor determining that the occupant accepted the request to actuate the vehicle system for autonomously driving the vehicle. The method 200 then proceeds to block 218.

At block 218, the longitudinal control submodule 106 and/or the lateral control submodule 112 autonomously drive the vehicle 100, in response to the associated longitudinal control submodule 106 and/or lateral control submodule 112 receiving the driving actuation signal from the processor 146. The method 200 then proceeds to block 220.

At block 220, the method 200 further includes updating, using the processor 146, the occupant behavior profile stored in the CRM 158 and/or the remote server 160 to include the current driving pattern. The method 200 further includes categorizing, using the processor 146, the current driving pattern, as saved in the CRM 158 and/or the remote server 160, based on the current emotion and the number of occupants in the vehicle 100. The method 200 then returns to block 202.

At block 222, the method 200 further includes generating, using the processor 146, an override actuation signal in response to the processor determining, in block 214, that the occupant did not accept the request to actuate the vehicle system for autonomously driving the vehicle (e.g., the occupant did not operate the HMI 116 for generating the activation signal and actuating the vehicle system 102 for autonomously driving the vehicle 100). The longitudinal control submodule 106 stops the vehicle 100 and turns off an ignition module of the vehicle 100, in response to the longitudinal control submodule 106 receiving the override actuation signal from the processor 146. The method 200 further includes transmitting, using the processor 146, the message to the communication device 162 (e.g., a mobile phone, a landline telephone, a wearable device, a computer, etc.) of the predetermined contact, in response the processor 146 determining that the deviation is above the first threshold and the processor 146 further determining that the occupant did not accept the request to actuate the vehicle system 102 for autonomously driving the vehicle 100. The message indicates to the predetermined contact the deviation of the current driving pattern, the identification of the occupant, the location of the occupant, the status of the stopped vehicle, and/or the like. The method 200 proceeds to block 220.

At block 224, the method 200 further includes comparing, using the processor 146, the deviation to the second threshold in response to the processor 146 determining, in block 210, that the deviation is not above the first threshold. If the deviation is above the second threshold, the method 200 proceeds to block 226. If the deviation is not above the second threshold, the method 200 immediately proceeds to block 220.

At block 226, the method 200 further includes generating, using the processor 146, the second notification signal in response to the processor 146 determining that the deviation is above the second threshold. The notification device 140 provides, to the occupant, feedback (e.g., a warning etc.) associated with the current driving pattern in response to the notification device 140 receiving the second notification signal from the processor 146. The method 200 proceeds to block 220.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor may be communicatively coupled to, e.g., via the vehicle communications module, more than one local processor, e.g., included in electronic processor units (ECUs) or the like included in the vehicle 100 for monitoring and/or controlling various vehicle components. The processor 130 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 130 may transmit messages to various devices in the vehicle 100 and/or receive messages from the various devices, e.g., vehicle sensors, actuators, vehicle components, a Human Machine Interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle system for recommending driving automation based on occupant behavior and emotion, the vehicle system comprising:
   at least one input device attached to the vehicle, with the at least one input device collecting sensor data that indicates a current emotion and a current driving pattern of an occupant and generating an input signal associated with the sensor data;
   at least one notification device attached to the vehicle, with the at least one notification device providing a notification that recommends that the occupant actuate the vehicle system for autonomously driving the vehicle; and
   a computer attached to the vehicle, with the computer comprising:
      at least one processor electronically connected to the at least one input device and the at least one notification device; and
      a non-transitory computer readable storage medium (CRM) storing a plurality of occupant behavior profiles, with each of the occupant behavior profiles including a unique occupant identification and an associated plurality of historical driving patterns, and each of the historical driving patterns having an associated historical emotion for the unique occupant identification, and the CRM further including instructions such that the at least one processor is programmed to:
         receive the input signal from the at least one input device;
         construct an emotion vector and the current driving pattern of the occupant in response to the at least one processor receiving the input signal from the at least one input device;
         collect, from the CRM, the occupant behavior profile that is associated with the occupant;
         determine a deviation of the current driving pattern from the historical driving patterns;
         compare the deviation to at least one threshold; and
         generate at least one notification signal in response to the at least one processor determining that the deviation is above the at least one threshold;
      wherein the at least one notification device provides the notification that recommends that the occupant actuate the vehicle system for autonomously driving the vehicle in response to the at least one notification device receiving the at least one notification signal from the at least one processor.

2. The vehicle system of claim 1 further comprising:
a longitudinal control submodule for controlling at least one of a propulsion actuation device and a braking actuation device of the vehicle;
a lateral control submodule for controlling a steering actuation device of the vehicle; and
a Human Machine Interface (HMI) for generating an activation signal to actuate the vehicle system in response to the occupant operating the HMI;
wherein the at least one processor is electronically connected to the longitudinal control submodule, the lateral control submodule, and the HMI, and the least one processor generates a driving actuation signal in response to the at least one processor receiving the activation signal from the HMI; and
wherein the longitudinal control submodule and the lateral control submodule autonomously operate the vehicle in response to the longitudinal control submodule and the lateral control submodule receiving the driving actuation signal from the at least one processor.

3. The vehicle system of claim 2 wherein the at least one threshold comprises first and second thresholds, with the second threshold being below the first threshold, where the at least one notification signal includes first and second notification signals, and the at least one processor is further programmed to:
compare the deviation to the first threshold;
generate the first notification signal in response to the at least one processor determining that the deviation is above the first threshold, where the at least one notification device requests the occupant to actuate the vehicle system to autonomously drive the vehicle in response to the at least one notification device receiving the first notification signal from the at least one processor;
compare the deviation to the second threshold in response to the at least one processor determining that the deviation is not above the first threshold; and
generate the second notification signal in response to the at least one processor determining that the deviation is above the second threshold, where the at least one notification device provides, to the occupant, feedback associated with the current driving pattern in response to the at least one notification device receiving the second notification signal from the at least one processor.

4. The vehicle system of claim 3 wherein the at least one processor is further programmed to generate the driving actuation signal in response to the at least one processor determining that the occupant accepted the request to actuate the vehicle system for autonomously driving the vehicle.

5. The vehicle system of claim 4 wherein the at least one processor is further programmed to generate an override actuation signal in response to the at least one processor determining that the deviation is above the first threshold and the at least one processor further determining that the occupant did not accept the request to actuate the vehicle system for autonomously driving the vehicle, where the longitudinal control submodule stops the vehicle and turns off the vehicle in response to the longitudinal control submodule receiving the override actuation signal from the at least one processor.

6. The vehicle system of claim 5 wherein the at least one processor is further programmed to transmit a message to at least one communication device of at least one predetermined contact in response the at least one processor determining that the deviation is above the first threshold and the at least one processor further determining that the occupant did not accept the request to actuate the vehicle system for autonomously driving the vehicle, with the message indicating to the at least one predetermined contact the deviation of the current driving pattern.

7. The vehicle system of claim 6 wherein the at least one processor is further programmed to update the occupant behavior profile to include the current driving pattern.

8. The vehicle system of claim 7 wherein the vehicle system further includes a remote server for storing the occupant behavior profile and wirelessly communicating with the at least one processor.

9. The vehicle system of claim 8 wherein the at least one input device comprises at least one of:
an occupant-facing camera attached to the vehicle, with the occupant-facing camera generating the input signal in response to the occupant-facing camera capturing an appearance of the occupant;
a wearable device carried by the occupant, with the wearable device having an Impulse Radio Ultra-Wide Band RADAR component (IR-UWB RADAR component) generating the input signal in response to the IR-UWB RADAR component measuring at least one of a pulse rate, a blood oxygen, a respiratory rate, a blood pressure and a temperature of the occupant; and
a microphone attached to the vehicle, with the microphone generating the input signal in response to the microphone capturing at least one word spoken by the occupant, a volume of a voice of the occupant, and a tone of the voice.

10. The vehicle system of claim 8 wherein the at least one input device comprises at least one of:
a torque sensor attached to a steering wheel of the vehicle, with the torque sensor measuring a torque that the occupant applies to the steering wheel;
an accelerometer attached to the vehicle, with the accelerometer measuring a plurality of acceleration forces on the occupant in response to the occupant operating the vehicle;
a lidar device attached to the vehicle, with the lidar device measuring a distance between the vehicle and an object in front of the vehicle; and
an externally-facing camera attached to the vehicle, with the externally-facing camera detecting a plurality of lane lines on a road.

11. A computer of a vehicle system for recommending driving automation based on occupant behavior and emotion, the computer comprising:
at least one processor attached to the vehicle, with the at least one processor electronically connected to at least one input device and at least one notification device; and
a non-transitory computer readable storage medium (CRM) storing a plurality of occupant behavior profiles, with each of the occupant behavior profiles including a unique occupant identification and an associated plurality of historical driving patterns, and each of the historical driving patterns having an associated historical emotion for the unique occupant identification, and the CRM further including instructions such that the at least one processor is programmed to:
receive an input signal from the at least one input device, with the input signal being associated with sensor data that indicates a current emotion and a current driving pattern of an occupant;

construct an emotion vector and the current driving pattern of the occupant in response to the at least one processor receiving the input signal from the at least one input device;
collect, from the CRM, the occupant behavior profile that is associated with the occupant;
determine a deviation of the current driving pattern from the historical driving patterns;
compare the deviation to at least one threshold; and
generate at least one notification signal in response to the at least one processor determining that the deviation is above the at least one threshold, such that at least one notification device provides a notification that recommends that the occupant actuate the vehicle system for autonomously driving the vehicle in response to the at least one notification device receiving the at least one notification signal from the at least one processor.

12. The computer of claim 11 wherein the at least one threshold comprises first and second thresholds, with the second threshold being below the first threshold, where the at least one notification signal includes first and second notification signals, and the at least one processor is further programmed to:
compare the deviation to the first threshold;
generate the first notification signal in response to the at least one processor determining that the deviation is above the first threshold, where the at least one notification device requests the occupant to actuate the vehicle system to autonomously drive the vehicle in response to the at least one notification device receiving the first notification signal from the at least one processor;
compare the deviation to the second threshold in response to the at least one processor determining that the deviation is not above the first threshold; and
generate the second notification signal in response to the at least one processor determining that the deviation is above the second threshold, where the at least one notification device provides, to the occupant, feedback associated with the current driving pattern in response to the at least one notification device receiving the second notification signal from the at least one processor.

13. The computer of claim 12 wherein the at least one processor is further programmed to generate a driving actuation signal in response to the at least one processor determining that the occupant accepted the request to actuate the vehicle system for autonomously driving the vehicle.

14. The computer of claim 13 wherein the at least one processor is further programmed to generate an override actuation signal in response to the at least one processor determining that the deviation is above the first threshold and the at least one processor further determining that the occupant did not accept the request to actuate the vehicle system for autonomously driving the vehicle, where a longitudinal control submodule stops the vehicle and turns off the vehicle in response to the longitudinal control submodule receiving the override actuation signal from the at least one processor.

15. The computer of claim 14 wherein the at least one processor is further programmed to transmit a message to at least one communication device of at least one predetermined contact in response the at least one processor determining that the deviation is above the first threshold and the at least one processor further determining that the occupant did not accept the request to actuate the vehicle system for autonomously driving the vehicle, with the message indicating to the at least one predetermined contact the deviation of the current driving pattern.

16. The computer of claim 15 wherein the at least one processor is further programmed to update the occupant behavior profile to include the current driving pattern.

17. The computer of claim 16 wherein the at least one processor is further programmed to categorize the current driving pattern based on the current emotion and a number of occupants in the vehicle.

18. A method of operating a computer of a vehicle system for recommending driving automation based on occupant behavior and emotion, the method comprising:
receiving, using at least one processor of the computer, an input signal from at least one input device, with the input signal being associated with sensor data that indicates a current emotion and a current driving pattern of an occupant;
constructing, using the at least one processor, an emotion vector and the current driving pattern of the occupant in response to the at least one processor receiving the input signal from the at least one input device;
collecting, using the at least one processor, an occupant behavior profile from a non-transitory computer readable storage medium (CRM), with the occupant behavior profile being associated with the occupant;
determining, using the at least one processor, a deviation of the current driving pattern from a plurality of historical driving patterns that are stored in the CRM;
comparing, using the at least one processor, the deviation to at least one threshold stored in the CRM; and
generating, using the at least one processor, at least one notification signal in response to the at least one processor determining that the deviation is above the at least one threshold, such that at least one notification device provides a notification that recommends that the occupant actuate the vehicle system for autonomously driving the vehicle in response to the at least one notification device receiving the at least one notification signal from the at least one processor.

19. The method of claim 18 further comprising:
comparing, using the at least one processor, the deviation to a first threshold of the at least one threshold;
generating, using the at least one processor, a first notification signal of the at least one notification signal in response to the at least one processor determining that the deviation is above the first threshold, where the at least one notification device requests the occupant to actuate the vehicle system to autonomously drive the vehicle in response to the at least one notification device receiving the first notification signal from the at least one processor;
comparing, using the at least one processor, the deviation to a second threshold of the at least one threshold in response to the at least one processor determining that the deviation is not above the first threshold; and
generating, using the at least one processor, a second notification signal of the at least one notification signal in response to the at least one processor determining that the deviation is above the second threshold, where the at least one notification device provides, to the occupant, feedback associated with the current driving pattern in response to the at least one notification device receiving the second notification signal from the at least one processor.

20. The method of claim 19 further comprising:
generating, using the at least one processor, a driving actuation signal in response to the at least one processor determining that the occupant accepted the request to actuate the vehicle system for autonomously driving the vehicle;

generating, using the at least one processor, an override actuation signal in response to the at least one processor determining that the deviation is above the first threshold and the at least one processor further determining that the occupant did not accept the request to actuate the vehicle system for autonomously driving the vehicle, where a longitudinal control submodule stops the vehicle and turns off the vehicle in response to the longitudinal control submodule receiving the override actuation signal from the at least one processor; and transmitting, using the at least one processor, a message to at least one communication device of at least one predetermined contact in response the at least one processor determining that the deviation is above the first threshold and the at least one processor further determining that the occupant did not accept the request to actuate the vehicle system for autonomously driving the vehicle, with the message indicating to the at least one predetermined contact the deviation of the current driving pattern.

\* \* \* \* \*